I. ROSE & H. A. SPEISER.
KNIFE.
APPLICATION FILED AUG. 24, 1915.
1,190,675.
Patented July 11, 1916.
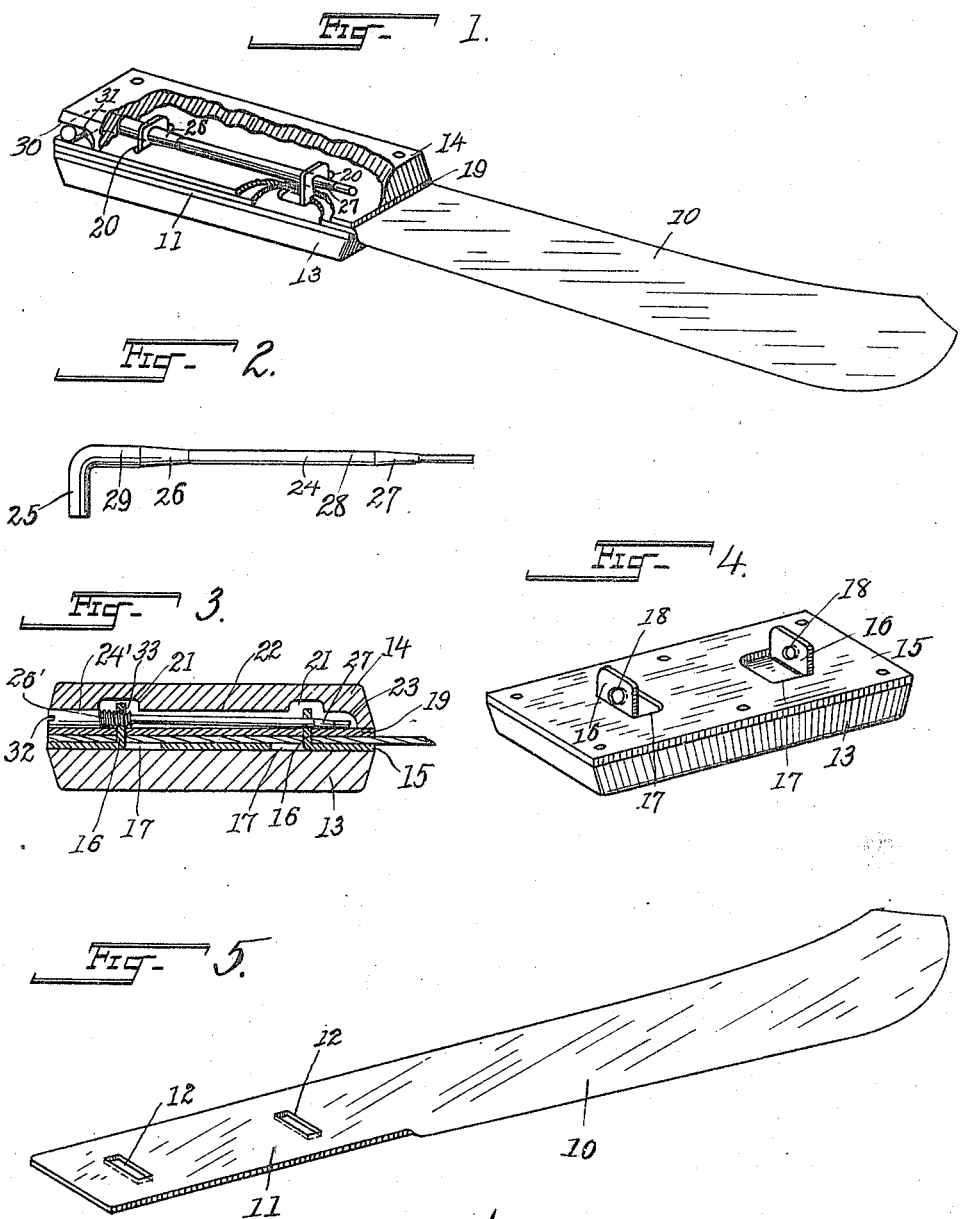

UNITED STATES PATENT OFFICE.

ISAAC ROSE, OF WEST ELIZABETH, AND HARRY A. SPEISER, OF NEWARK, NEW JERSEY.

KNIFE.

1,190,675.　　　　Specification of Letters Patent.　　Patented July 11, 1916.

Application filed August 24, 1915. Serial No. 47,088.

*To all whom it may concern:*

Be it known that we, ISAAC ROSE, a citizen of the United States, and HARRY A. SPEISER, a subject of the Emperor of Austria-Hungary, and residents of West Elizabeth, county of Union, and State of New Jersey, and Newark, county of Essex, and State of New Jersey, respectively, have jointly invented certain new and useful Improvements in Knives, of which the following is a specification.

Our invention relates to knives, and more particularly to knives in which the blade member comprising blade and blade tang, and the handle plates or scales may be readily assembled together or separated at will.

Our improvements are applicable to any knife having a blade with a flat or scale tang as, for example, to butcher knives and similar knives.

The ordinary butcher knife with the handle scales permanently secured in place, as by means of rivets, affords numerous opportunities in its various depressions, cracks, cavities and openings of one kind or another, for the lodgment of meat or the like, and the decayed matter thus finding lodgment in the knife and handle and the microbes with which it speedily becomes infested makes such a knife with permanently attached handle an article which is decidedly unsanitary. Furthermore, the presence of the permanently attached handle interferes to a considerable extent with the grinding or sharpening of the blade, particularly at and near the heel of the blade.

According to our invention the handle scales are removable, thus permitting every part to be readily and thoroughly cleaned and sterilized, and permitting all parts in the entire length of the blade to be sharpened with equal accuracy and facility. With our improved construction it is possible to make use of a single handle with a large number of blades, the blade tangs and the handle scales being preferably made to a uniform standard size so that a single pair of handle scales may be attached to the tang of any blade, or reversely any pair of a large number of pairs of handle scales may be used with a single blade and blade tang. With such arrangement it becomes possible for a single small establishment equipped with proper sharpening, cleaning and sterilizing facilities to provide a complete sanitary and sharpening knife service for a number of butcher shops or meat stores, and this may be accomplished with a relatively small number of extra blades and handle scales, the tangs of the various blades and the handles all being made to a uniform standard size so as to be completely interchangeable with one another.

Among the objects of our invention are the provision of an improved knife having the desired features referred to and which may be simply and cheaply constructed, is rugged and will not get out of order, and in which the blades can be changed in the handle, or the handle on the blades, with ease and rapidity, and when such changes are made the parts are strongly and securely held in place until voluntarily and intentionally disassembled.

With the foregoing and related objects in view, our invention consists in the parts, improvements and combinations herein set forth and claimed.

In the accompanying drawing we have illustrated a preferred embodiment of our invention, but it is to be understood that the embodiment illustrated is not the only form in which our invention may be realized, but that such showing is for the purpose of illustration only.

In the said drawing forming a part of this specification and wherein the same reference numerals are uniformly used to designate the same parts throughout, Figure 1 is a view in perspective, with parts broken away, of one form of knife embodying our invention. Fig. 2 is a side elevational view of one form of fastening rod or key for securing the handle together and in place upon the blade tang. Fig. 3 is a central longitudinal sectional view of a handle equipped with a fastening rod or key of modified form. Fig. 4 is an elevational view of one of the handle scales and fastening lugs formed thereon, and Fig. 5 is an elevational view of the preferred form of knife blade and tang.

The blade is designated by the reference numeral 10 and the blade tang 11 is formed integral with and as an endwise continuation of the blade 10. Such blade tang is preferably formed with flat parallel sides but may be of any form adapted to receive on each of its sides handle scales of a simple and readily constructed form. Such tang 11 is provided with openings 12, 12 preferably having their longest dimension extending transversely of the blade tang, as shown. The pair of scales which receive the tang 11 between them and go to make up the handle are designated by the numerals 13 and 14. Such scales are preferably of wood but may be made of other materials. One of said scales, namely, that designated by reference numeral 13, is provided with lugs extending through the openings 12, 12 in the blade tang and adapted to be detachably held by suitable means in the remaining scale 14. In the form of construction shown, this result is secured by providing the scale 13 with a preferably metallic lining 15, firmly secured in place thereon as by means of rivets, and the lugs 16, 16 are connected with such lining 15. In the form shown these lugs are struck up from the material of the lining 15, the two lugs 16, 16 being formed toward the respective ends of the lining 15 and the material being struck up from the regions 17, 17 immediately adjacent to and between the lugs. These lugs are provided with openings 18, 18, as clearly shown in Fig. 4. These lugs 16, 16 extend through the openings 12, 12 in the blade tang 11 and project therebeyond into the second scale 14 of the pair going to make up the handle and are secured therein by means entering the openings 18, 18. In the form shown the scale 14 is provided with a lining 19 preferably of metal firmly secured thereto by rivets, and such lining is provided with openings 20, 20 registering with the openings 12, 12 in the blade tang 11, and recesses 21, 21 are formed in the scale 14 immediately back of the openings 20, 20 in its lining 19 so that the lugs 16, 16 may project through and beyond the said openings in the lining 19. The scale 14 is also provided with a lengthwise extending groove or orifice 22 preferably terminating somewhat short of the forward end of the scale 14, as shown at 23, and open at its opposite end. The locking pin or rod is received in this lengthwise extending orifice 22 and may take the form shown in Fig. 2, in which there is illustrated a rod 24 having a preferably right-angled extension 25 and provided with two tapered regions 26 and 27 leading respectively to relatively enlarged stem portions 28 and 29. With this form of fastening member, the lengthwise groove or orifice 22 is extended downwardly or toward the sharpened edge of the knife, as is shown at 30 in Fig. 1.

When the parts have been put in place with the lugs 16, 16 extending through the openings 12, 12 and 20, 20 in the blade tang 11 and lining 19, respectively, the fastening or locking pin 24 is inserted through the opening 22 and passed through the holes 18, 18 in the lugs 16, 16 and firmly secures the parts together, the parts being securely wedged into close contact by means of the wedge or tapered portions 26 and 27 of the locking pin 24, exerting a wedge action between the outer parts of the lugs 16 and the lining 19 of the scale 14, as will be clearly understood from Fig. 1. Since the tapered or wedge portions 26 and 27 pass beyond the openings 18, 18, as shown in Fig. 1, there will be no tendency of the parts to become disassembled, the holding or locking being accomplished by the straight portions 28, 29 of the locking pin 24. In this form of construction the extension 25 of the pin 24 fits in the downward extension 30 of the groove or orifice 22, so that there is no projecting part exposed to catch or to chafe the hand of the user. The end of the extension 25 is preferably about flush with the surface of the scale 14, and a slight undercut 31 may be formed in the material of the scale immediately adjacent to the end of the extension 25 to give access to such projection 25 in order to force the locking pin 24 out of position when it is desired to disassemble the parts.

In the modified form shown in Fig. 3, the extension 25 of the handle is dispensed with and a screw-slot 32 is formed in the end of the locking pin 24'. In this form one of the lugs, preferably the rearward lug 16, is provided with a threaded opening 33 and the locking pin 24' has its portion 26' which enters the opening 33 threaded preferably upon a slight taper. To aid in assembling the parts with this type of locking pin the pin 24' is pushed into place as far as it will go and then screwed in the rest of the way by means of a screw-driver, and upon disassembling, the reverse operation is performed, as will be readily understood.

While we have illustrated and described certain forms of construction embodying our invention, it is to be understood that the invention is not confined thereto, but that modifications and changes may be resorted to within the scope defined by our claims and without departing from our invention or sacrificing any of the advantages thereof.

Having thus described our invention, we claim:

1. In a knife, a blade member comprising a blade and a blade tang, said blade tang being provided with apertures, a handle scale provided with perforated lugs extending through said apertures, a handle scale on the opposite side of said tang, and means in the last named scale and received in the perforations in the lugs for detachably securing the parts together, substantially as set forth.

2. In a knife, a blade tang provided with apertures, a handle scale provided with perforated lugs extending through said apertures, a handle scale on the opposite side of said blade tang, and a key extending through said apertures in the lugs and provided with wedge-shaped portions for detachably securing said parts closely together with a wedging action, substantially as set forth.

3. In a knife, a blade member comprising a blade and an apertured tang integral therewith, a pair of handle scales each provided with metallic linings, perforated lugs on one of said linings and extending through the apertures in the tang and through the remaining lining, and means back of said remaining lining and within its scale for detachably locking the parts together, substantially as set forth.

4. In a knife, a blade member comprising a blade and a flat tang integral therewith, the tang being provided with perforations, a handle scale on one side of said tang, a metallic lining secured to said handle scale, lugs on said lining and adapted to extend through the apertures in the blade tang, a handle scale on the other side of said tang, a metallic lining for said handle scale, said lining having apertures registering with those in the blade tang, and a locking key passing through the perforations in the lugs where the same project beyond the last named lining, substantially as set forth.

5. In a knife, a blade member comprising a blade and a flat tang integral therewith, said tang being provided with apertures, a pair of handle scales, perforated lugs on one of said handle scales and extending through said apertures in the blade tang, and a key in the remaining handle scale passing through the perforations in the lugs and having a right-angled extension, said extension being received within a recess provided in the last named handle scale, substantially as set forth.

6. In a knife, a blade member comprising a blade and a tang integral therewith, said tang being provided with apertures, a pair of handle scales, one of said handle scales having lugs extending through said apertures and the remaining handle scale having recesses for receiving said projecting lugs and provided with a longitudinal recess and a transversely extending recess communicating therewith at its rear end and extending to the bottom of said handle scale, and a locking key provided with wedging surfaces adjacent to each of said lugs and lying in said recess and extending through the perforations in said lugs, said key having a right-angled extension lying in said extension of the recess in said scale, substantially as set forth.

7. In a knife, a blade member comprising a blade and a flat apertured tank integral therewith, a handle scale, perforated lugs on the handle scale extending through the apertures in the blade tang, a second handle scale provided with a longitudinal recess and with recesses for receiving said lugs, and a locking key received in said longitudinal recess and extending through the apertures in the lugs and having tapered portions leading to straight portions of increased diameter, the distance between said wedging portions being substantially the same as the distance between the lugs, whereby the parts may be secured and detachably locked together with a wedging action exerted upon each of said lugs, substantially as set forth.

8. In a knife, a blade member comprising a blade and a tang integral therewith and provided with apertures, a handle scale provided with perforated lugs extending through said apertures in said tang and projecting beyond the tang at the opposite side thereof, a handle scale on the last named side and provided with a key-receiving recess extending through the rear end of said scale but terminating short of the end toward the blade, and a locking key received within said recess and passing through the apertures in the lugs, the rearward end of said key being accessible for insertion and removal at the open end of said recess and the opposite end of said key being covered and protected by the material of said scale, substantially as set forth.

In testimony that we claim the foregoing, we hereto set our hands, this 21st day of August, 1915.

ISAAC ROSE.
HARRY A. SPEISER.

Copies of this patent may be obtained for five cents each, by addressing the "Commissioner of Patents, Washington, D. C."